United States Patent [19]

Lilly, Jr. et al.

[11] 4,439,663

[45] Mar. 27, 1984

[54] METHOD AND SYSTEM FOR LASER PERFORATION OF SHEET MATERIAL

[75] Inventors: A. Clifton Lilly, Jr., Richmond; Warren E. Claflin, Bon Air; Edward B. Stultz, Richmond; Ulysses A. Brooks, Glen Allen; Peter Martin, Richmond, all of Va.

[73] Assignee: Philip Morris Incorporated, New York, N.Y.

[21] Appl. No.: 286,635

[22] Filed: Jul. 24, 1981

Related U.S. Application Data

[63] Continuation of Ser. No. 932,566, Aug. 10, 1978, abandoned.

[51] Int. Cl.$^3$ .............................................. B23K 27/00
[52] U.S. Cl. ........................ 219/121 LK; 219/121 LL
[58] Field of Search ................. 219/121 LK, 121 LL, 219/121 L, 121 LM, 121 LY, 121 LS, 121 LT, 121 LQ, 121 LR

[56] References Cited

U.S. PATENT DOCUMENTS

| | | | |
|---|---|---|---|
| 2,012,352 | 8/1935 | Rusting et al. | 88/16 |
| 2,547,623 | 4/1951 | Cockrell | 346/33 |
| 2,844,648 | 7/1958 | Rosenthal | 178/7.1 |
| 2,875,017 | 2/1959 | Reynolds | 346/109 |
| 3,022,704 | 2/1954 | Cary | 88/14 |
| 3,154,370 | 10/1964 | Johnson | 346/108 |
| 3,175,196 | 3/1965 | Lee, Jr. et al. | 340/173 |
| 3,226,527 | 12/1965 | Harding | 219/384 |
| 3,256,524 | 6/1966 | Stauffer | 346/76 |
| 3,262,122 | 7/1966 | Fleisher et al. | 346/0.1 |
| 3,303,739 | 2/1967 | Chitayat | 88/1 |
| 3,325,819 | 6/1967 | Fraser | 346/76 |
| 3,348,233 | 10/1967 | Hertz | 346/76 |
| 3,389,403 | 6/1968 | Cottingham et al. | 346/108 |
| 3,474,457 | 10/1969 | Becker | 346/76 |
| 3,482,254 | 12/1969 | Harrison et al. | 346/76 |
| 3,524,046 | 8/1970 | Brouwer | 219/384 |
| 3,528,424 | 9/1970 | Ayres | 128/303.1 |
| 3,537,306 | 11/1970 | Bedinger | 73/170 |
| 3,543,183 | 11/1970 | Heimann | 331/94.5 |
| 3,597,578 | 8/1971 | Sullivan et al. | 219/121 L |
| 3,619,028 | 11/1971 | Keene et al. | 350/7 |
| 3,622,740 | 11/1971 | Ravussin et al. | 219/121 L |
| 3,658,422 | 4/1972 | Wilkinson | 356/89 |
| 3,679,863 | 7/1972 | Houldcroft et al. | 219/121 LM |
| 3,787,121 | 1/1974 | Lowy et al. | 356/93 |
| 3,819,277 | 6/1974 | Berthelot et al. | 356/204 |
| 3,826,578 | 7/1974 | King et al. | 356/237 |
| 3,838,912 | 10/1974 | Arimoto et al. | 350/285 |
| 3,901,601 | 8/1975 | Lahmann | 356/97 |
| 3,943,324 | 3/1976 | Haggerty | 65/108 |
| 3,985,420 | 10/1976 | Grose | 350/7 |
| 3,993,402 | 2/1976 | Fredrick, Jr. | 350/285 |
| 4,063,064 | 12/1977 | Saunders et al. | 219/121 L |
| 4,083,629 | 4/1978 | Kocher et al. | 350/285 |
| 4,088,865 | 5/1978 | Peters et al. | 219/121 L |
| 4,115,683 | 9/1978 | Clark et al. | 219/121 L |
| 4,118,619 | 10/1978 | McArthur et al. | 219/121 L |
| 4,121,595 | 10/1978 | Heitmann et al. | 131/21 R |
| 4,125,755 | 11/1978 | Plamquist | 219/121 L |
| 4,153,369 | 5/1979 | Kallet et al. | 356/318 |
| 4,218,606 | 8/1980 | Whitman | 216/121 LK |

FOREIGN PATENT DOCUMENTS

| | | |
|---|---|---|
| 2828754 | 2/1979 | Fed. Rep. of Germany . |
| 2754104 | 6/1979 | Fed. Rep. of Germany . |
| 2320918 | 3/1977 | France . |
| 2379992 | 9/1978 | France . |
| 2399374 | 3/1979 | France . |
| 2439643 | 5/1980 | France . |
| 51-134996 | 11/1976 | Japan . |
| 7514132 | 9/1976 | Netherlands . |
| 925798 | 5/1963 | United Kingdom . |
| 1273983 | 5/1972 | United Kingdom . |
| 1368819 | 10/1974 | United Kingdom . |
| 1455327 | 11/1976 | United Kingdom . |
| 2015813A | 9/1979 | United Kingdom . |
| 2032325A | 5/1980 | United Kingdom . |

OTHER PUBLICATIONS

H. E. Klauser, *IBM Technical Disclosure Bulletin*, "Laser Micromachine," vol. 21, No. 11, Apr. 1979, p. 4431–4432.

Belleson, J. G., "Scanning Method Employing Multiple Flying Spots per Field", *IBM Tech. Disc. Bull.*, vol. 15, No. 5, Oct. 1972, pp. 1479–1480.

Grimm, M. A. "Optical System for Laser Machining of Narrow Slots", *IBM Tech. Disc. Bull.*, vol. 14, No. 9, Feb. 1972, pp. 4621–4642.

Kremen, S. H. "Prism Deflector for Laser Machining", *IBM Tech. Disc. Bull.*, vol. 8, No. 6, Nov. 1965, p. 882.
Seebe, N. B., "Light Scanners", *IBM Tech. Disc. Bull.*, vol. 16, No. 6, Nov. 1973, pp. 1964–1966.
Duden, Fremdworterbuch, 3rd Ed., 1974, p. 451.

*Primary Examiner*—C. L. Albritton
*Attorney, Agent, or Firm*—Robert M. Shaw

[57] ABSTRACT

In the perforation of sheet material by light energy, a continuous focused laser beam is reflected from different locations along the beam axis to provide separate pulsed beams and the beams are issued onto the sheet material with the same beam cross-sectional area. In one aspect, the lengths of respective different light paths for conveyance of light from the point of focus of the laser to final image locations are made equal. In another aspect, different focusing elements may be included in light paths to provide for sameness of beam cross-sectional area at the final image locations. The light paths are preferably provided in part by light conducting apparatus having light-reflective elements mounted for movement, such that different perforation matrices may be readily attained.

7 Claims, 7 Drawing Figures

METHOD AND SYSTEM FOR LASER PERFORATION OF SHEET MATERIAL

This is a continuation of application Ser. No. 932,566, filed Aug. 10, 1978, now abandoned.

FIELD OF THE INVENTION

This invention relates generally to perforating material by the use of light energy and pertains more particularly to methods and systems providing spatially precise matrices of perforations in sheet material.

BACKGROUND OF THE INVENTION

In perforating sheet material, a two-dimensional hole matrix is frequently sought with rigorous limits on perforation spacing uniformity as between rows and columns of the matrix. An illustrative field of current interest is that of perforating cigarette filter tipping paper, where hole matrix uniformity enables consistency of cigarette dilution characteristics. In various known mechanical puncture and electric arc perforating practices, row spacing is rendered precise by providing an individual perforating device for each row. Uniformity in the spacing of perforations made in each row, and hence precise column spacing is achieved by synchronizing operation of each perforating device. Since the perforating devices, e.g., pin or electrode pair, are physically limited in size, these practices can readily accommodate quite close spacing of adjacent rows of the matrix.

The prior art has also encompassed perforating practices involving lasers providing pulsed or continuous light energy in row-column perforation. In these efforts, however, there generally has been an apparent preference, for economic and physical size reasons, for use of a single laser serving both row and column perforation. Known single laser practices of type affording spacing uniformity have involved the splitting of the laser beam into plural beams, one for each row, and the focusing of light onto a sheet member by use of an individual lens for each row. Spacing of perforations by precise limits within each row has been sought by inclusion of a movable reflective element in each of the plural beam paths. Complexity attends precision movement, e.g., vibration or pivoting, of such reflective element into and out of its reference plane, to uniformly locate holes in rows, and the present state of the art is accordingly limited.

The foregoing prior art practices and references illustrating same and other practices are further discussed in the statement filed herein pursuant to 37 CFR 1.97 and 1.98.

SUMMARY OF THE INVENTION

The present invention has, as its primary object, the provision of improved methods and systems for perforating sheet material by the use of light energy.

A more particular object of the invention is to provide for expeditious perforation of cigarette filter tipping paper by laser.

In attaining these and other objects, methods of the invention provide for the focusing of a continuous beam of light energy and reflection of the focused beam at locations spaced from one another along the beam axis to generate pulsed light beams. The beams are conducted to material to be perforated in like beam cross-sectional area, thereby to render hole size uniform.

In a particularly preferred embodiment, the system of the invention employs commonly rotative reflective discs for generation of the pulsed light beams, and uses variably positionable light-conducting apparatus, whereby different perforation matrices are made readily available.

The foregoing and other objects and features of the invention will be further understood from the following detailed description of preferred methods and systems and from the drawings wherein like reference numerals identify like parts throughout.

DESCRIPTION OF PREFERRED METHODS AND EMBODIMENTS

Figure 1:
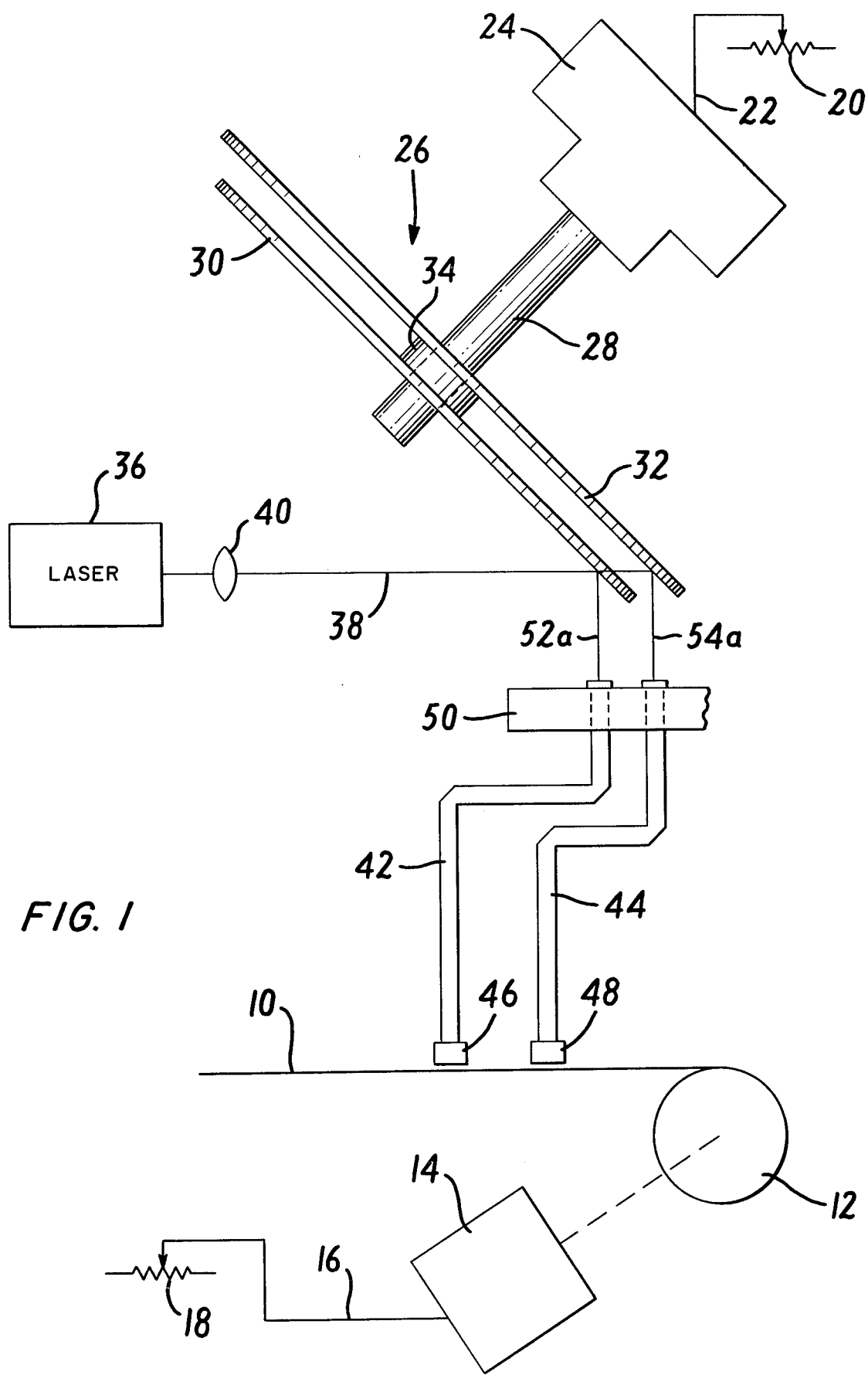
FIG. 1 is a block diagrammatic showing of a preferred system embodiment.

Referring to FIG. 1, a web 10 of sheet material is collected by take-up drum 12 following horizontal transport from a payout drum, not shown. Take-up drum 12 is rotated by drive unit 14 with drum speed being established by a control signal on line 16 as furnished by potentiometer 18.

A further signal is derived from potentiometer 20 and applied to line 22 for control of drive unit 24 of light-reflector assembly 26, which comprises shaft 28, rotated by drive unit 24, light-reflective discs 30 and 32 and spacer 34, keyed to shaft 28 with the discs for rotation therewith.

Laser 36 generates a continuous output beam 38 which is focused by lens 40 at a location adjacent discs 30 and 32. Light beams reflected by the discs are conducted by apparatus 42 and 44, which include respective issue focus elements 46 and 48, and are supported by fixed frame 50 for independent rotation about the axes 52a and 54a of the pulsed beams.

Figure 2:
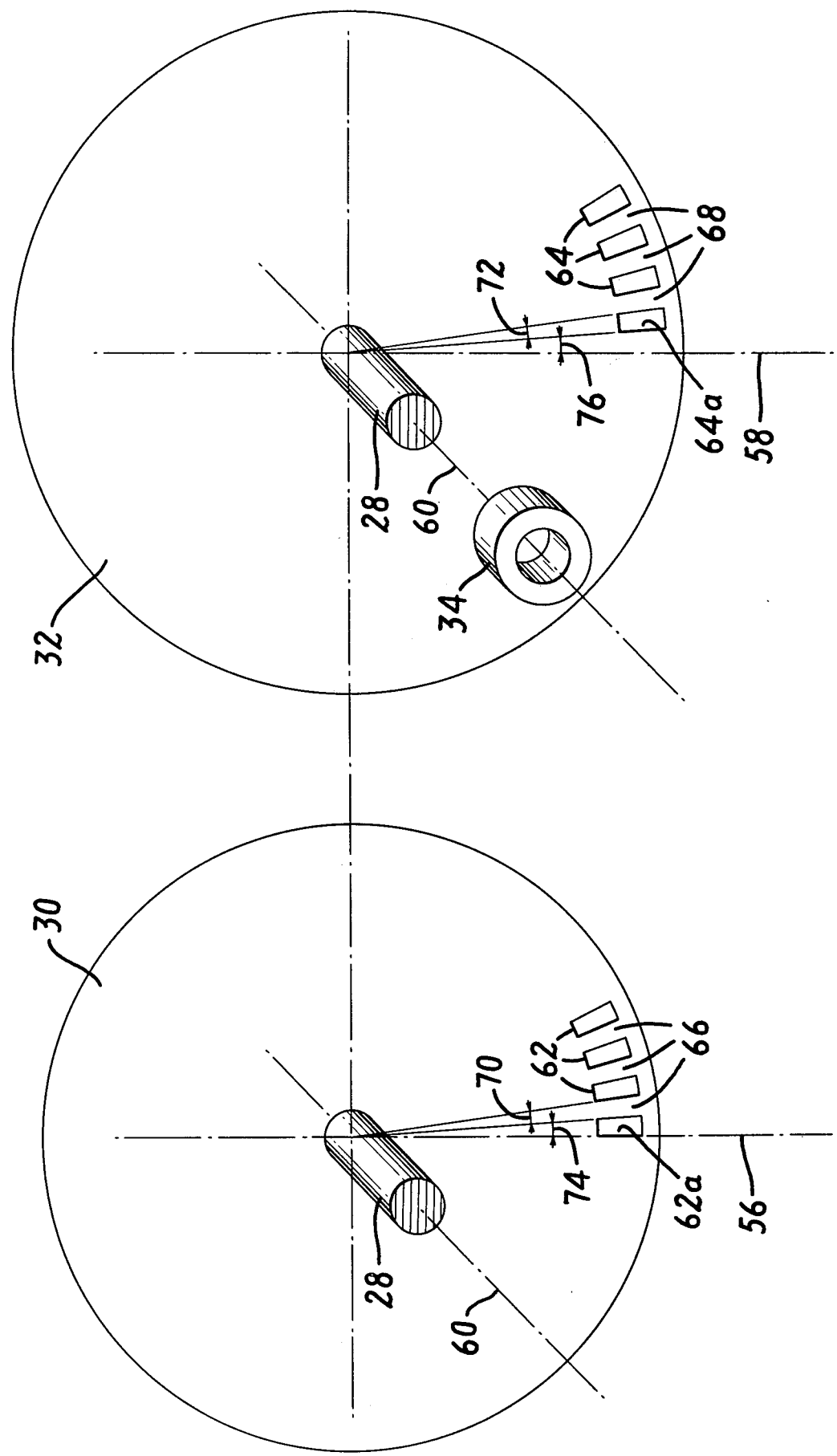
FIG. 2 is a perspective view of the reflective discs of FIG. 1, the discs being shown side-by-side for purposes of explanation.

FIG. 2 shows in side-by-side perspective disc 30 and disc 32, as the latter would be seen rightwardly of disc 30 in FIG. 1. The discs are keyed to shaft 28 in position wherein lines 56 and 58 are in a common plane with shaft axis 60. In the illustrative embodiment wherein two discs are used and are intended to confront beam 38 (FIG. 1) alternately, the discs have light transmissive uniformly spaced peripheral portions 62 and 64 which are mutually staggered, defining reflective facets 66 and 68 therebetween. Forty-five such facets are typically employed with each facet subtending four degrees of arc (angles 70 and 76) and each transmissive portion also subtending four degrees of arc (angles 74 and 72). With transmissive portion 62a having its leading edge aligned with line 56 and transmissive portion 64a spaced from line 58 by facet angle 76, the discs are properly aligned for alternate reflection of the laser beam, the beam passing through transmissive portion 62a to be reflected by the facet clockwise of transmissive portion 64a. The light-transmissive portions are typically openings in the discs of size sufficient to freely pass the laser beam. Spacer 34 is selected of extent along axis 60 to space discs 30 and 32 to position as desired the locations of the origins of modified beams reflected by the disc facets. While disc 32 might be constructed with no light-transmissive portions since it is the last disc from the laser, the described construction mitigates against spurious reflection of the laser output beam by disc 32 during confrontation of facets of disc 30 with the laser beam, i.e., laser output beam spillage beyond disc 30 simply passes through disc 32 openings.

Figure 3:
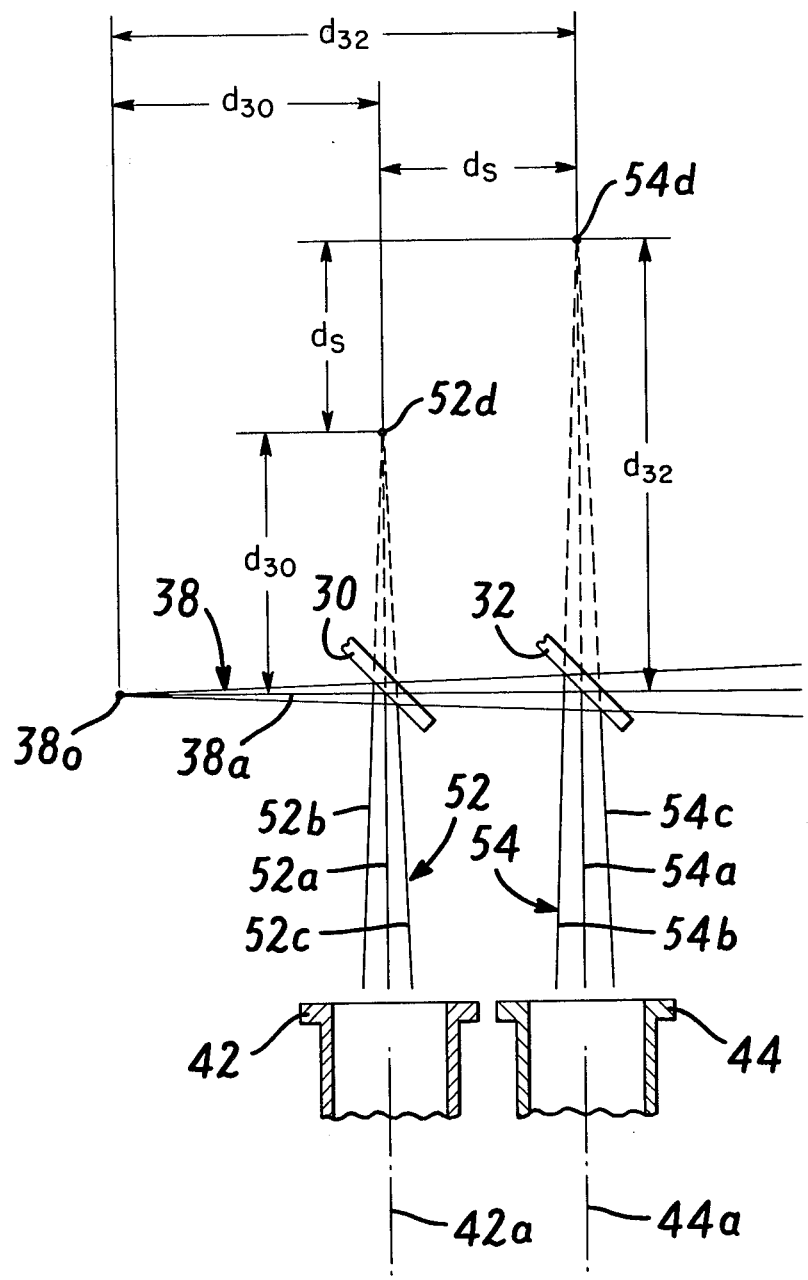
FIGS. 3 and 4 are optical diagrams applicable to the FIG. 1 system.

Referring to FIG. 3, each confrontation of a facet of disc 30 with beam 38 will give rise to the propagation of a modified version of the laser output beam, such modified beam being shown at 52 and having central axis 52a, i.e., axis of symmetry, which is made parallel to the optical axis 42a of apparatus 42 by the orientation of disc 30. Beam 52 has outer rays 52b and 52c, which diverge respectively oppositely from beam central axis 52a. The virtual object or origin location of beam 52 is shown at 52d.

On each confrontation of a facet of disc 32 with beam 38, further modified beam 54 is generated, having central axis 54a (axis of beam symmetry), made parallel to optical axis 44a of tube 44. Beam 54 has divergent outer rays 54b and 54c and has virtual object or origin location 54b. Distance $d_{30}$ identifies both the distance between disc 30 and beam origin $38_o$ along axis 38a and the distance between disc 30 and origin location 52d along axis 52a. Likewise, distance $d_{32}$ identifies both the distance between disc 32 and beam origin $38_o$ along axis 38a and the distance between disc 32 and origin location 54d along axis 54a. The spacing of disc 30 from disc 32 along axis 38a is defined by $d_s$.

Figure 4:
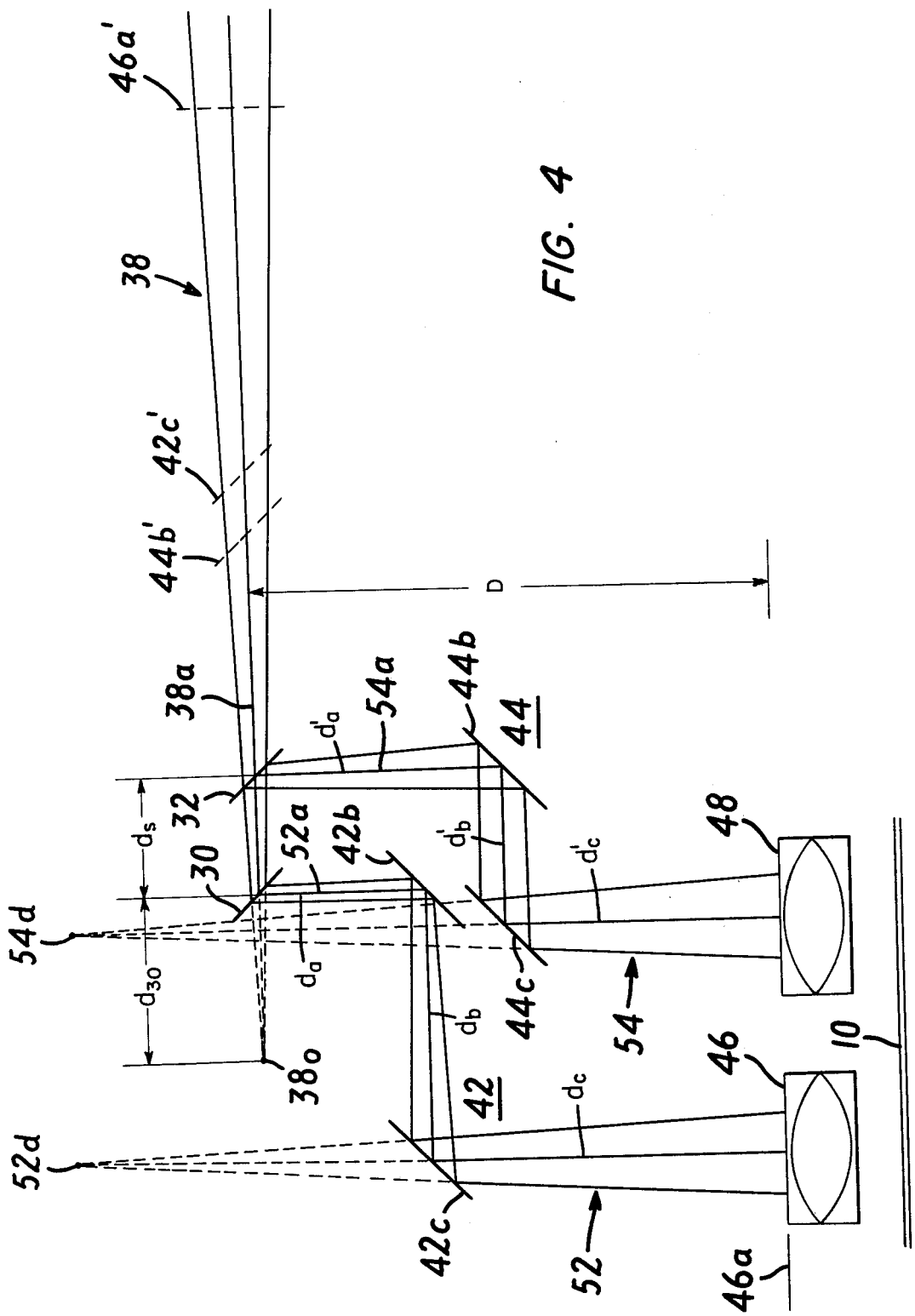

Referring to FIG. 4, apparatus 42 includes plane reflective elements 42b and 42c. Element 42c is aligned with issue focus element 46, having entry plane 46a. Apparatus 44 includes plane reflective elements 44b and 44c, the latter aligned with issue focus element 48, whose entry plane is also plane 46a.

If one were to move focus elements 46 and 48 into alignment directly with discs 30 and 32, respectively, and dispense with reflective elements 42b, 42c, 44b and 44c, a distance D would then apply to each of the light paths extending from disc to issue focus element. The light path from laser beam origin $38_o$ for the disc 30-reflected beam would then be $d_{30}$ plus D, and for the disc 32-reflected beam would then be $d_{30}$ plus $d_s$ plus D. Considering reduction factors, i.e., the ratio of image size to object size, the arrangement under discussion yields different reduction factors based on such different length light paths. Attainment of equal perforation hole size for each beam is evidently unattainable in such arrangement where compensation for the different length light paths is not introduced, e.g., by different focusing characteristics of issue focus elements 46 and 48. While such arrangement and compensation are within the purview of the subject invention, the use of apparatus 42 and 44, now discussed in detail, is preferred as facilitating attainment of reduction factors of like magnitude for each disc-reflected beam and equality in perforation hole size without need for greatly different optics in the issue focus elements or elsewhere.

A distance $d_a$ is selected as between disc 30 and element 42a along axis 52a. A distance $d_b$ is selected along an axis parallel to beam axis 38a between elements 42b and 42c. A distance $d_c$ is selected along an axis parallel to axis 52a between element 42c and the entry plane 46a of issue focus element 46. As the divergence of beam 52 is constant throughout its passage through apparatus 42, and is prescribed by the divergence of beam 38, one may simply lay off distances along axis 38a corresponding to the location of reflective elements 42b and 42c to determine the divergence of beam 52 in the course of its passage through apparatus 42. For example, element 42c is disposed distant from origin location 52d by the sum of distances $d_{30}$, $d_a$ and $d_b$. Line 42c', struck across beam 38 at such composite distance identifies divergence which will occur at element 42c. Divergence at plane 46a is obtained by laying off along axis 38a the composite distance $d_{30}$, $d_a$, $d_b$ and $d_c$, such divergence being indicated by line 46a' along axis 38a. Virtual object 52d is distant from element 42c by the sum of distances $d_{30}$, $d_a$ and $d_b$.

Distances $d_a'$, $d_b'$ and $d_c'$ of apparatus 44 correspond in type to distances $d_a$, $d_b$ and $d_c$. Divergence at reflective element 44b is indicated by line 44b' along axis 38a, i.e., at distance from origin $38_o$ equal to the sum of $d_{32}$ and $d_a'$.

With virtual object 54d at identical distance from focus entry plane 46a as virtual object 52d, like beam cross-sectional area will occur for each beam at plane 46a. Otherwise stated, like reduction factors will apply to light conducted from beam origin $38_o$ to the conveyance plane of the sheet material, whether such light is reflected by disc 30 or disc 32. To this end, the composite path length for disc 32-reflected beams, i.e., the sum of $d_{30}$, $d_s$, $d_a'$, $d_b'$ and $d_c'$, is made equal to the above-noted composite path length for disc 30-reflected beams, namely, the sum of $d_{30}$, $d_a$, $d_b$ and $d_c$.

As will be seen from the foregoing, the invention realizes a common cross-section, at the transport plane of material to be perforated, for beams generated alternately at different locations along the path of a focused light beam by equalizing reduction factors thereof.

By way of further example, assume issue focus element 48 to be in registry with disc 32 (elements 44b and 44c omitted). Direct reflectance path length is now D for the beam reflected by disc 32 to issue focus element 48. The composite path length for light yielding such beam is $d_{30}$ plus $d_s$ plus D. To now conform, to such length, the composite path length for light yielding the disc 30-reflected beam, one causes the latter length to exceed the direct reflectance path from disc 30 to issue focus element 46. For equal light path lengths, one simply spaces reflectors 42b and 42c by distance $d_s$, whereby the composite path length for light yielding the disc 30-reflected beam is also $d_{30}$ plus $d_s$ plus D.

Where different length beam light paths exist from the point of focus of the laser beam to the issue focus elements (or conveyance plane), compensation is made by different focusing optics. The path lengths are preferably forced to related lengths, however, to minimize disparities in focusing optics.

Figure 5:
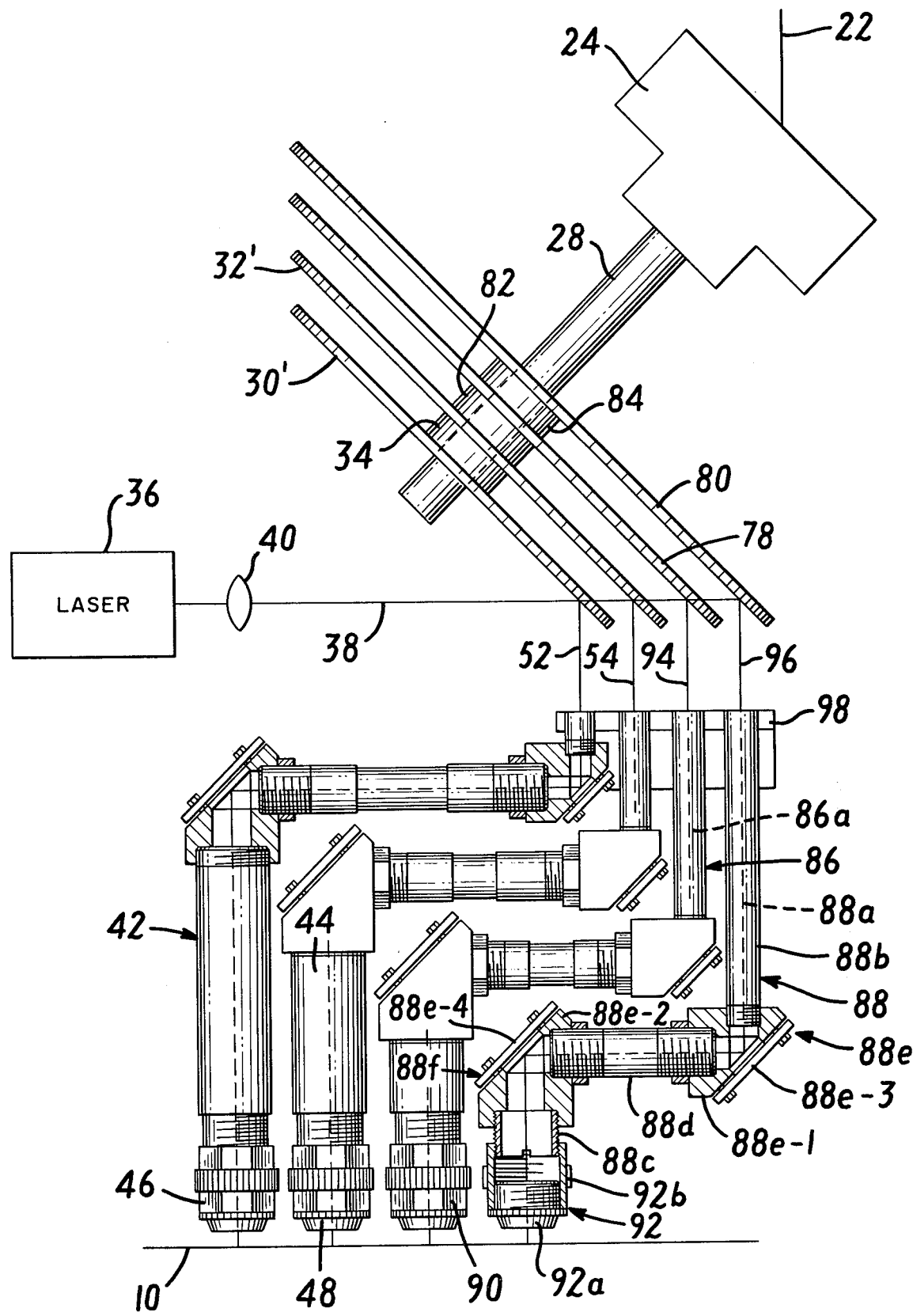
FIG. 5 depicts a further system embodiment expanded from the FIG. 1 system to include additional reflective discs.

In FIG. 5, four reflective discs, 30', 32', 78 and 80, are spaced along shaft 28 by spacers 34, 82 and 84. Additional light conducting apparatus 86 and 88 have issue focus elements 90 and 92. Modified beams 94 and 96 are propagated respectively by the facets of discs 78 and 80. Beam 82 is divergent about a central symmetry axis coincident with optical axis 86a of apparatus 86. Beam 88 is divergent about a central symmetry axis coincident with optical axis 88a of apparatus 88.

Each of the light conducting apparatus 42, 44, 86 and 88 is in the form of a tube. Tube 88 is typical of all tubes, comprising vertical conduits 88b and 88c, horizontal conduit 88d and reflector assemblies 88e and 88f. The horizontal conduit has threaded end connections with reflector assembly blocks 88e-1 and 88e-2, thus providing a vernier-type adjustment of overall tube length and enabling the practice of varying the length of the light path from its predetermined length to permit like cross-sectional areas of beams as they issue from the tubes. Plane reflector blocks 88e-3 and 88e-4 are releasably secured to the reflector assembly blocks. Issue focus element 92 has lens holder 92a secured in housing 92b which is threadably secured to vertical conduit 88c, thus permitting adjustment of lens position relative to web 10. Tubes 40, 42, and 86 and 88 are commonly supported by housing 98, the horizontal and lower vertical conduits being rotatable about the upper vertical conduit. The tubes are selected to have internal diameter in excess of the maximum cross-section of the beams conveyed thereby, i.e., the tube walls do not intercept or reflect the beams. Thus, the tubes function as housings for supporting the reflective elements therein such that successive elements, e.g., 42b and 42c (FIG. 4), are maintained in mutually fixed spatial relation and both thereof may rotate jointly about the central axis of the beam incident on the first such element. As a practical safety matter, the tubes serve also to contain the beams and minimize operating hazards.

Figure 6:
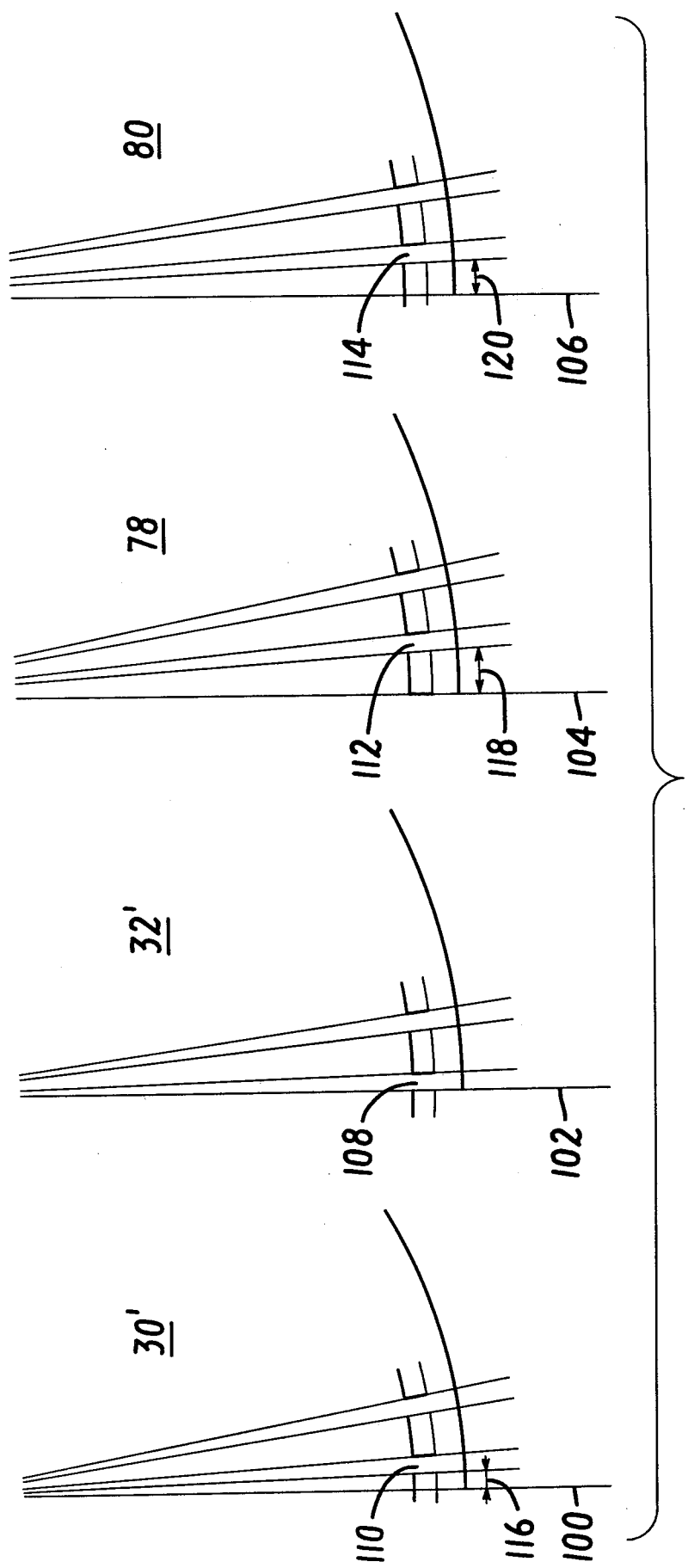
FIG. 6 shows the respective configurations of the reflective discs of the expanded system.

FIG. 6 shows the configurations of discs 30', 32', 78 and 80. With all discs keyed to common plane keying lines 100, 102, 104 and 106, and assuming forty-five facets per disc as in the system of FIGS. 1-3, facets of all discs each subtend two degrees of arc and openings thereof each subtend six degrees of arc. Facet 108 of disc 32' has its leading clockwise edge coincident with keying line 102. Facets 110, 112 and 114 of disc 30', 78 and 80 have their leading clockwise edges spaced from keying lines 100, 104 and 106 respectively by two, six and four degree angles 116, 118 and 120. By this configuration, it will be seen that clockwise rotation of shaft 28 will give rise to successive propagation of modified beams 54, 52, 96 and 94 (FIG. 5). Such firing order is chosen simply for illustration and any firing order may be employed by modifying the registry of facets and transmissive portions of the discs. As noted for the two disc embodiment above, the last successive disc may be arranged without light-transmissive portions, but same are preferred to mitigate against spurious light energy reflections from such last disc. The laser beam is focused to its divergence origin $36_o$ (FIG. 4), such that the beam cross-section clears the openings of the penultimate disc (disc 78), thereby assuring that the full beam can be incident on each disc.

Figure 7:
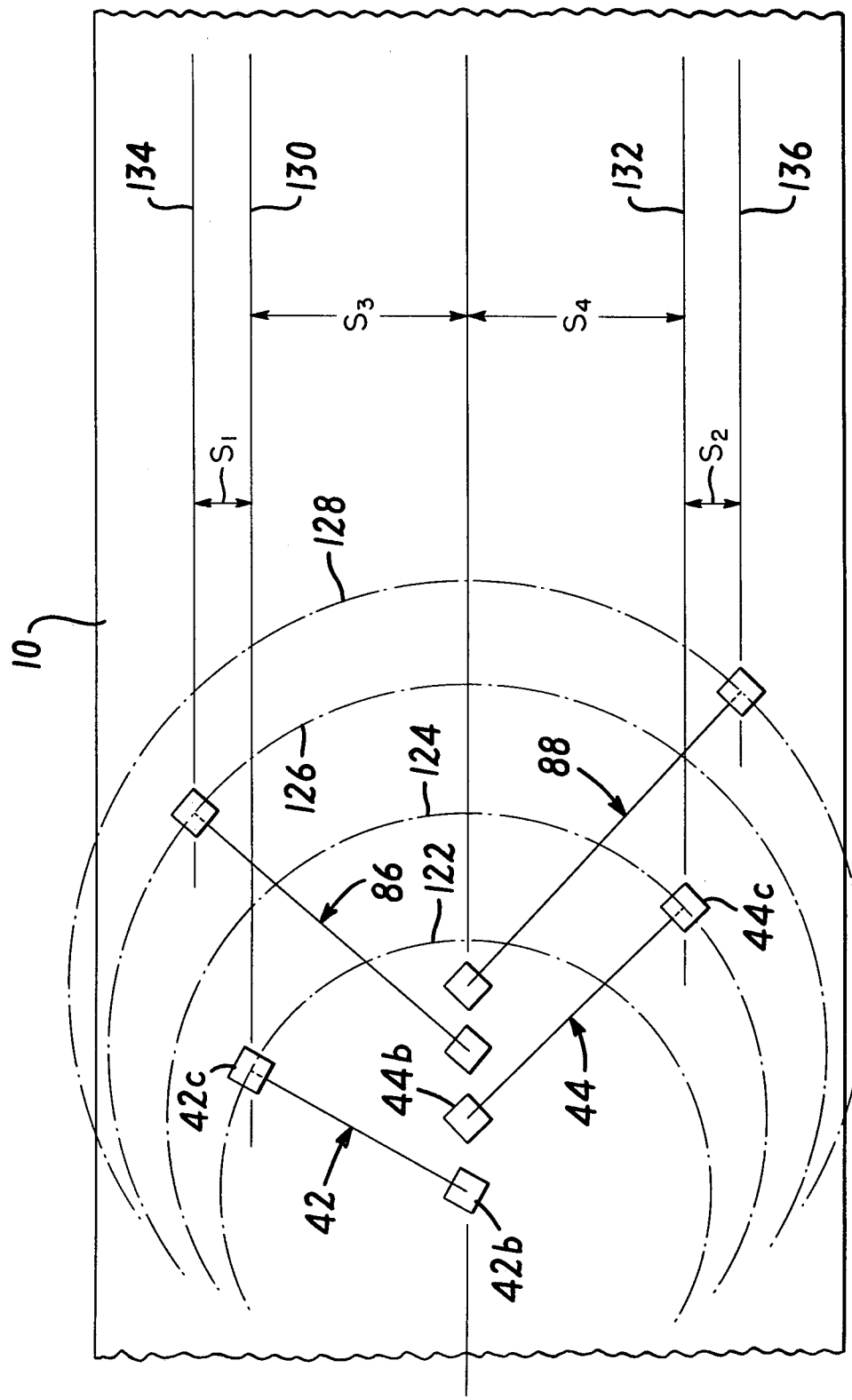
FIG. 7 is a schematic drawing explanatory of variable perforating matrices attainable with the expanded system of FIG. 5.

Referring to FIG. 7, circular paths 122, 124, 126 and 128 define the possible locations of the issue focus elements of tubes 42, 44, 86 and 88, respectively. As indicated, the paths interfere with one another in the leftward extents thereof but are non-interfering in remaining rightward positional range. In an illustrative perforation matrix setting, the tubes are set as indicated, such that tube 42 provides perforation row 130, tube 44 provides row 132, tube 86 provides row 134 and tube 88 provides row 136. Spacing $S_1$ between rows 130 and 134 is established by the setting of tubes 42 and 86 relative to one another. Spacing $S_2$ between rows 132 and 136 is established by the setting of tubes 44 and 88 relative to one another. The settings of tubes 42 and 44 further provides spacings $S_3$ and $S_4$ of respective rows 130 and 132 from the center line of web 10. The illustrated perforation arrangement is applicable, for example, in cigarette making for perforation of filter tipping paper. Typically, opposed tobacco rod sections and an intervening double filter link are brought to end-to-end abutting relation and perforated filter tipping paper (web 10) is applied thereto for joining the tobacco rod sections and the intervening double filter link. Subsequently, a cut is made symmetrically of the assembly, i.e., along the center line of web 10 paper. Two independent cigarettes are thus made, each having concentric spaced rows of perforations equally spaced from the filter end.

Perforation pattern change may be achieved simply by repositioning the participating tubes. Perforation density in such rows is controllable by the adjustments to the speed of rotation of the reflective disc assembly and the transport speed of the web. Hole size is rendered quite uniform among the rows by the practice discussed above for establishing path lengths and/or employing compensatory focusing optics. Light path definition and enclosure by devices other than the illustrated tube assembly may be undertaken. The invention contemplates the stacking of plural lenses in the issue focus elements for size reduction of holes. These and other changes may be introduced without departing from the invention. The particularly discussed practices and specifically disclosed embodiments are accordingly intended in an illustrative and not in a limiting sense. The true spirit and scope of the invention is set forth in the appended claims.

What is claimed is:

1. A method of forming plural spaced rows of spaced uniform perforations in sheet material, comprising:
    (a) projecting an initial beam of light energy from a laser through a lens;
    (b) establishing a conveyance plane for said sheet material;
    (c) deriving in time succession from said initial beam, a plurality of spaced beams each having an axis of symmetry parallel, at derivation, to the axes of symmetry, at derivation, of the other spaced beams and perpendicular, at derivation, to the conveyance plane, said derived beams having unequal cross-sectional expanse;
    (d) establishing a separate light path for each spaced beam from its point of derivative to the conveyance plane such that the distance from the lens to the conveyance plane is the same for each spaced beam so that the cross-sectional areas of said spaced beams at their respective points of contact with said conveyance plane are equivalent and such that the axis of symmetry of each said spaced beam at its point of contact with the conveyance plane is perpendicular thereto and is parallel to the axes of said other spaced beams at their respective points of contact with said plane;
    (e) conducting each said spaced beam along its respective light path such that each spaced beam contacts the conveyance plane at a location on the surface of said plane spaced apart from the locations at which the other spaced beams contact the conveyance plane;
    (f) passing each modified beam through an issue focus element located at a point in its light path proximate the conveyance plane to focus the beam at a point on the conveyance plane;

(g) conveying said sheet material past the points at which said beams are focused on the conveyance plane so that, as said sheet material is conveyed past said points, the time successive derivation and the equal light path lengths of said beams result in plural spaced rows of spaced uniform perforations in said sheet material.

2. A system for providing a matrix of uniform perforations in sheet material as said sheet material is transported through a conveyance plane, comprising:

(a) a laser for generating an initial beam of light energy, (b) means for successively intercepting said initial beam at spaced locations along the axis thereof for generation of spaced modified beams having, at generation, parallel axes of symmetry and unequal cross-sectional expanse;

(c) an initial lens disposed in the path of said beam between said laser and said interception means;

(d) light conducting means associated with each said modified beam and disposed between said interception means and said conveyance plane for conducting each said modified beam from its point of generation to a separate location on the conveyance plane, each said light conducting means having a different length light path such that the distance from the initial lens to the interception means to the conveyance plane is the same for each modified beam and so that the cross-sectional areas of the modified beams at their respective points of contact with the conveyance plane are equivalent, said conducting means being disposed such that the axis of symmetry of each said spaced beam at its point of contact with the conveyance plane is perpendicular thereto and is parallel to the axes of said other spaced beams at their respective points of contact with the conveyance plane;

(e) an issue focus element associated with the conveyance plane end of each light conducting means, said issue focus elements having a common entry plane and being positioned to focus said modified beams at respective spaced points on said conveyance plane;

(f) transport means for transporting said sheet through the conveyance plane such that as said sheet material is transported past the points at which said modified beams are focused on the conveyance plane, the successive interception of said initial focused beam and the conveyance of the modified beams through said light conduction means and issue focus elements results in a matrix of uniform perforations in said sheet material.

3. The system of claim 2 wherein said means for successively intercepting said initial beam comprises commonly rotative discs spaced along the axis of the initial beam, each said disc having light reflective and light transmissive portions fixed, relative to the other discs, such that the light reflective portions in each subsequent disc are in registry with a light transmissive portion in each preceding disc, said discs being positioned such that the light reflective and light transmissive portions of each disc rotate through the axis of the initial beam.

4. The system of claim 3 wherein said initial beam is focused by said initial lens so that the cross-sectional area of the focused initial beam clears the light transmissive portions of each disc.

5. The system of claim 2 wherein each said light conducting means comprises a series of light-transmissive tubes having internal diameter in excess of the maximum cross-sectional diameter of the modified beam conveyed coaxially therethrough, including an initial tube having an inlet end and an issue end and being coaxial with and located with its issue end adjacent the location at which the modified beam is generated, said initial tube being rotatably supported at said inlet end in a fixed frame for rotation about the axis of the coaxial modified beam, a final tube having an inlet end and an issue end, and wherein the issue focus element is in registry with the issue end of said final tube, said final tube having its longitudinal axis perpendicular to the conveyance plane, said inlet end of said final tube being connected to the issue end of said initial tube through one or more intermediate tubes, said tubes being serially joined one to the other at their ends through junction means, said junction means containing internal light reflective means positioned such that the modified beam is conveyed coaxially through each tube, said intermediate and final tubes being fixed for rotation with said initial tube about the axis of the coaxial modified beam, said tubes being selected such that the light path from the initial lens to the interception means then through the tubes to the conveyance plane is equal to the light path of the ultimate modified beam from the initial lens to the interception means then through its respective light-transmissive tubes to the conveyance plane.

6. The system of claim 5 wherein there is a single intermediate tube between the initial tube and the final tube.

7. The system of claim 2, 5, or 6 wherein said light conducting means are variably positionable to provide for selection of different perforation matrices.

* * * * *